United States Patent Office 3,574,752
Patented Apr. 13, 1971

3,574,752
5-(2 - ALKYLAMINOETHYLIDENE) - 10,11-DI-
HYDRO- AND- 5H-DIBENZO[a,d]CYCLOHEP-
TENES AND THE SALTS THEREOF
Edward L. Engelhardt, Gwynedd Valley, Pa., assignor to Merck & Co., Inc., Rahway, N.J.
No Drawing. Filed Aug. 21, 1967, Ser. No. 661,783
Int. Cl. C07c 87/28
U.S. Cl. 260—570.8
7 Claims

ABSTRACT OF THE DISCLOSURE

This application relates to secondary aminoethylidene derivatives of 5H-dibenzo[a,d]cycloheptenes and the corresponding 10,11-dihydro derivatives. The compounds of this invention are useful as antiarrhythmic agents as well as local anesthetic agents. They are prepared by reaction of a selected 5-(2-bromoethylidene)-5H-dibenzo[a,d]cycloheptene or the corresponding 10,11-dihydro derivative with a primary amine such as methylamine, ethylamine, and the like, to form the product directly.

---

This invention relates to dibenzocycloheptene derivatives and methods for the preparation of such compounds.

More particularly, this invention relates to 5H-dibenzo[a,d]cycloheptenes containing an alkylaminoethylidene substituent attached at the 5-position thereof, and to the process of preparing such compounds from the corresponding 5-(2-haloethylidene)-5H-dibenzo[a,d]cycloheptene, e.g., 5-(2-bromoethylidene)-5H - dibenzo[a,d]cycloheptene.

The process for the preparation of the compounds of my invention includes treating said 5-(2-bromoethylidene) compounds with a primary amine to effect replacement of the bromo substituent with a secondary amino substituent. Thus, in accordance with one embodiment of my invention, a 5-(2-bromoethylidene)-5H-dibenzo[a,d]cycloheptene or the corresponding 10,11-dihydro derivative thereof is condensed with a primary amine, especially a straight or branched chain lower aliphatic amine to produce the desired 5-(2-secondary-aminoethylidene)-5H - dibenzo[a,d]cycloheptene or the corresponding 10,11-dihydro derivative thereof.

It is preferred to employ as the primary amine reactant used in the process of my invention a straight or branched chain aliphatic amine, especially an aliphatic amine having from 1 to 4 carbon atoms, or a cycloaliphatic amine, particularly cyclopropyl or cyclobutyl. The aromatic portion of the dibenzocycloheptene nucleus may be further substituted.

The novel compounds of the invention may be represented by the following formula:

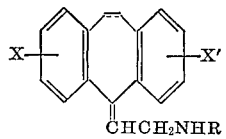

wherein R is a saturated or unsaturated alkyl or cycloalkyl group having from 1 to 4 carbon atoms, and X and X' are similar or dissimilar and are selected from hydrogen, an alkyl group having up to 4 carbon atoms, an alkenyl group having up to 4 carbon atoms, a perfluoroalkyl group having up to 4 carbon atoms, a phenyl or a substituted-phenyl radical, an alkylsulfonyl grou phaving up to 4 carbon atoms, an alkylsulfonylamino group having up to 4 carbon atoms, halogen (fluorine, chlorine, bromine or iodine), alkoxy having up to 4 carbon atoms, mercapto, an alkylmercapto group having up to 4 carbon atoms, sulfamoyl, an alkylsulfamoyl group having up to 4 carbon atoms, or a dialkylsulfamoyl group having up to 8 carbon atoms.

Also included within the scope of this invention are the non-toxic pharmaceutically-acceptable acid addition salts of the secondary amines of my invention formed from such pharmaceutically-acceptable non-toxic acids as hydrochloric acid, hydrobromic acid, acetic acid, ascorbic acid, glutamic acid, lactic acid, tartaric acid, maleic acid, phosphoric acid, benzoic acid, and the like. The dotted line between the 10 and 11 carbon atoms indicates that the compound may be saturated or unsaturated at this location, the saturated compound being identified as a 10,11-dihydro derivative.

The compounds represented by the above formula are useful as antiarrhythmic agents. Thus, the compounds of the present invention can be used in the treatment of irregularities in cardiac rhythm and for prophylaxis against such cardiac irregularities. The compounds are preferably administered in unit doses, in a dose range of from 5–700 mg./day. As antiarrhythmic agents, these compounds may be administered orally in the form of tablets, powders, sustained release pellets, and the like, or they may be administered orally or parenterally in the form of aqueous solutions or suspensions. Such formulations may be prepared in conventional manner employing conventional pharmaceutical carriers and excipients. A solution for injection is conveniently prepared by dissolving a suitable amount of said acid salt in sterile distilled water. The solution is rendered isotonic by the addition of sodium chloride, mannitol, or sodium citrate, as required, and preferably is stabilized with antioxidants and preservatives. It is then filled into ampules, each ampule containing 5 cc., and the ampules are sterilized in an autoclave at 123° C.

Injectable solutions can also be prepared by adding the selected base to an aqueous solution of the stoichiometric amount of an acid such as hydrochloric acid, hydrobromic acid or an organic acid such as acetic acid, ascorbic acid, glutamic acid, lactic acid, maleic acid and the like.

In addition to the antiarrhythmic activity of the compounds of the present invention, these compounds are also useful because of their local anesthetic activity. The compounds of my invention can thus be used in solution as the acid addition salts to effect useful local anesthesia in warm-blooded animals by the injection of, for example, a 0.5% solution of the hydrochloride of 5-(2-N-methylaminoethylidene)-5H-dibenzo[a,d]cycloheptene.

The amine bases of this invention form acid addition salts readily by mixing the base with a stoichiometrically equivalent quantity of the selected acid in a relatively nonpolar solvent such as diethyl ether. The acid addition salts which are formed in this manner readily precipitate from solution as white crystalline solids. These solids are ordinarily soluble in most highly polar oxygenated solvents such as ethanol, acetone, water, and the like.

The compounds of this invention are prepared by reaction of 5-(2-bromoethylidene)-5H-dibenzo[a,d]cycloheptene or the corresponding 10,11-dihydro derivative thereof with the desired primary amine as, for example, methylamine, ethylamine, propylamine, butylamine, isopropylamine, cyclobutylamine, and the like, to produce the secondary aminoethylidene 5H-dibenzo[a,d]cycloheptene compounds of the present invention. The reaction is carried out by mixing together the primary amine and the bromoethylidene derivative in a suitable solvent for a period of from a few minutes to several hours. Although not absolutely necessary to effect reaction and produce the compounds of my invention, it is preferable to heat the reaction mixture in order that the reaction is completed in a minimum period of time. In case one of the reacting species is a volatile substituent as, for example, methyl or ethylamine, the reaction is preferably carried out in a sealed vessel. The compounds produced in accordance with the process of this invention include secondary aminoethylidene derivatives of 5H-dibenzo [a,d]-cycloheptene such as:

5-(2-methylaminoethylidene)-5H-dibenzo[a,d]cycloheptene,
5-(2-ethylaminoethylidene)-5H-dibenzo[a,d]cycloheptene,
5-(2-propylaminoethylidene)-5H-dibenzo[a,d]cycloheptene,
5-(2-butylaminoethylidene)-5H-dibenzo[a,d]cycloheptene,
5-(2-isobutylaminoethylidene)-5H-dibenzo[a,d]cycloheptene,
5-(2-isopropylaminoethylidene)-5H-dibenzo[a,d]cycloheptene,
5-(2-tertiarybutylaminoethylidene)-5H-dibenzo[a,d]cycloheptene,
5-(2-cyclobutylaminoethylidene)-5H-dibenzo[a,d]cycloheptene,
5-(2-methylaminoethylidene)-10,11-diyhydro-5H-dibenzo[a,d]cycloheptene,
5-(2-ethylaminoethylidene)-10,11-dihydro-5H-dibenzo[a,d]cycloheptene,
5-(2-propylaminoethylidene)-10,11-dihydro-5H-dibenzo[a,d]cycloheptene,
5-(2-butylaminoethylidene)-10,11-dihydro-5H-dibenzo[a,d]cycloheptene,
5-(2-isobutylaminoethylidene)-10,11-dihydro-5H-dibenzo[a,d]cycloheptene,
5-(2-isopropylaminoethylidene)-10,11-dihydro-5H-dibenzo[a,d]cycloheptene,
5-(2-tertiarybutylaminoethylidene)-10,11-dihydro-5H-dibenzo[a,d]cycloheptene, and
5-(2-cyclobutylaminoethylidene)-10,11-dihydro-5H-dibenzo[a,d]cycloheptene, as well as the corresponding derivatives containing substituents of the type described hereinabove as X and X' substituents attached to the benzenoid ring.

The compounds of this invention prepared as described above are isolated and purified by methods well known in the art for the isolation of secondary amino compounds. This involves extraction of the reaction mixture after acidification with dilute acid with ether or an aromatic hydrocarbon or a nonpolar solvent for the unreacted starting materials; and after removal of the unreacted starting materials, rendering the aqueous solution of the amine hydrochloride alkaline and extracting the amine into ether; separating the ether extract and removing the ether, leaving the desired secondary amine as a residue. The nontoxic pharmaceutically-acceptable acid addition salts of the amine bases prepared in this manner are formed by dissolving the amine base in a suitable solvent such as alcohol and adding a stoichiometrically equivalent amount of the selected acid. The salt may then be precipitated by concentrating the solution or adding ether. The invention is further illustrated by the following specific example.

EXAMPLE 1

5-(2-methylaminoethylidene)-5H-dibenzo[a,d]cycloheptene hydrochloride

A mixture of 23.56 g. (0.108 mole) of 5-ethylidene-5H-dibenzo[a,d]cycloheptene, 216 ml. of carbon tetrachloride and 19.22 g. (0.108 mole) of N-bromosuccinimide is prepared and the mixture stirred and heated at the reflux temperature for about 2 hours to produce 5-(2-bromoethylidene)-5H-dibenzo[a,d]cycloheptene. After cooling to room temperature, the succinimide is separated by filtration. The yellow filtrate containing the bromo derivative is added over a period of 30 minutes to a stirred solution of 466.2 g. of methylamine in 380 ml. of absolute ethanol with cooling at 0–5° C. The solution is stirred at 0–5° C. for a period of 1 hour and then heated to the reflux temperature for an additional hour. The solvent is evaporated under reduced pressure and the oily residue comprising the 5-(2-methylaminoethylidene)-5H-dibenzo[a,d]cycloheptene is extracted with 350 ml. of 3 N hydrochloric acid at steam bath temperature. The acidic extract is decanted from the oily residue and reserved for further treatment, and the remaining residue suspended in 500 ml. of water which is adjusted to pH 4 with 3 N aqueous hydrochloric acid solution.

Another 500 ml. of water is then added, which dissolves the oily product. The aqueous solution is washed twice with benzene and then added to the acidic extract which was previously decanted. The combined extracts are made alkaline with 20% sodium hydroxide solution and extracted with benzene. The benzene extracts are washed with water, dried, and the benzene removed under reduced pressure, leaving the 5-(2-methylaminoethylidene)-5H-dibenzo[a,d]cycloheptene as the residual orange colored oil. The oily product is dissolved in 100 ml. of isopropyl alcohol and 9 ml. of 7.97 N ethanolic hydrochloric acid solution is added to form the hydrochloride of the amine product. Anhydrous ether (approximately 280 ml.) is added until the solution becomes cloudy and the hydrochloride salt crystallizes therefrom. Recrystallization from a mixture of isopropyl alcohol and ether yields product melting at 232–233° C. This material is sublimed at 180°/0.1 mm. and the sublimate is recrystallized from a mixture of isopropyl alcohol and ether to yield product melting at 233.1–234.1° C.

*Analysis.*—Calcd. for $C_{18}H_{17}N \cdot HCl$ (percent): C, 76.18; H, 6.39; Cl, 12.49. Found (percent): C, 76.28; H, 6.42; Cl, 12.38.

EXAMPLE 2

5-(2-alkylaminoethylidene)-5H-dibenzo[a,d]cycloheptene hydrochloride

The procedure of the preceding example is repeated using 5-(2-bromoethylidene)-5H-dibenzo[a,d]cycloheptene as the starting material and using in place of the methylamine reactant, ethylamine, propylamine, butylamine, isobutylamine, isopropylamine, t-butylamine, cyclobutylamine or cyclopropylamine to produce the compounds of my invention 5-(2-ethylaminoethylidene)-5H-dibenzo[a,d]cycloheptene,
5-(2-propylaminoethylidene)-5H-dibenzo[a,d]cycloheptene,
5-(2-butylaminoethylidene)-5H-dibenzo[a,d]cycloheptene,
5-(2-isobutylaminoethylidene)-5H-dibenzo[a,d]cycloheptene,
5-(2-isopropylaminoethylidene-5H-dibenzo[a,d]cycloheptene,
5-(2-tertiarybutylaminoethylidene)-5H-dibenzo[a,d]cycloheptene,
5-(2-cyclobutylaminoethylidene)-5H-dibenzo[a,d]cycloheptene,
5-(2-cyclopropylaminoethylidene)-5H-dibenzo[a,d]cycloheptene.

The hydrochlorides of the above-identified compounds are converted to other non-toxic pharmaceutically acceptable acid addition salts by dissolving each of said salts in water, rendering the solution alkaline with sodium hydroxide, extracting the free base into ether, evaporating the ether and treating an alcoholic solution of the base with the stoichiometric quantity of the desired acid, such as, hydrobromic acid, acetic acid, ascorbic acid, glutamic acid, lactic acid, maleic acid, phosphoric acid or benzoic acid dissolved in alcohol to produce the corresponding acid addition salt of the above-named amine. The salts are precipitated by concentrating the solution and adding a less polar solvent such as ethyl acetate or ether.

EXAMPLE 3

5-(2-alkylaminoethylidene)-10,11-dihydro-5H-dibenzo[a,d]cycloheptene hydrochloride The procedure of the preceding example is repeated using 5-(2 - bromoethylidene)-10,11-dihydro-5H-dibenzo-[a,d]cycloheptene as the starting material and using in place of the methylamine reactant ethylamine, propylamine, butylamine, isobutylamine, isopropylamine, t-butylamine, cyclobutylamine or cyclopropylamine to produce the compounds of my invention 5-(2-methylaminoethylidene) - 10,11-dihydro-5H-dibenzo[a,d]cycloheptene, 5-(2-ethylaminoethylidene)-10,11-dihydro - 5H - dibenzo-[a,d,]cyclophetene, 5-(2 - propylaminoethylidene)-10,11-dihydro-5H-dibenzo[a,d]cycloheptene, 5-(2-butylaminoethylidene) - 10,11-dihydro-5H-dibenzo[a,d]cycloheptene, 5-(2 - isobutylaminoethylidene)-10,11-dihydro-5H-dibenzo[a,d]cycloheptene, 5 - (2 - isopropylaminoethylidene)-10,11-dihydro - 5H - dibenzo[a,d]cycloheptene, 5-(2-tertiarybutylaminoethylidene) - 10,11 - dihydro-5H-dibenzo-[a,d]cycloheptene, 5 - (2 - cyclobutylaminoethylidene)-10,11-dihydro-5H-dibenzo[a,d]cycloheptene, 5-(2 - cyclopropylaminoethylidene) - 10,11-dihydro-5H-dibenzo[a,d]cycloheptene.

EXAMPLE 4

5-(2-alkylaminoethylidene) - 5H - dibenzo[a,d]cycloheptene or 5-(2-alkylaminoethylidene)-10,11-dihydro-5H-dibenzo[a,d]cycloheptene compounds which contain additional substituents in the aromatic nucleus The procedures of Examples 2 and 3 are repeated using the dibenzocycloheptene or the 10,11-dihydrodibenzocycloheptene compounds named therein containing one or more additional substituents at the 1, 2, 3, 4, 6, 7, 8 or 9 positions, selected from the group consisting of methyl, ethyl, propyl, phenyl, chlorophenyl, methylsulfonyl, methylsulfamoyl, dimethylsulfamoyl, chloro, fluoro, bromo, ethoxy, propoxy, methoxy or methylthio

What is claimed is:

1. The compound of the formula

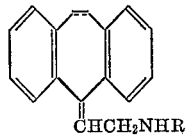

wherein R is an alkyl having from 1 to 4 carbon atoms or cycloalkyl group having from 3 to 4 carbon atoms or a non-toxic pharmaceutically-acceptable acid addition salt thereof.

2. The compound of claim 1 which contains a double bond connecting the 10 and 11 carbon atoms.

3. The compound of claim 2 wherein R is lower alkyl.

4. The compound 5-(2-methylaminoethylidene)-5H-dibenzo[a,d]cycloheptene hydrochloride according to claim 3.

5. The compound of claim 1 which contains a single bond connecting the 10 and 11 carbon atoms.

6. The compound of claim 5 wherein R is lower alkyl.

7. The compound 5-(2-methylaminoethylidene)-10,11-dihydro-5H-dibenzo[a,d]cycloheptene hydrochloride according to claim 6.

References Cited

UNITED STATES PATENTS

| | | | |
|---|---|---|---|
| 3,258,459 | 6/1966 | Yale et al. | 260—570.8X |
| 3,359,263 | 12/1967 | Stelt | 260—570.8X |
| 3,272,864 | 9/1966 | Hoffsommer et al. | 260—570.8 |
| 3,409,640 | 11/1968 | Villani | 260—570.8 |
| 3,420,848 | 1/1969 | Jucker et al. | 260—570.8X |
| 3,435,073 | 3/1969 | Judd et al. | 260—570.8 |

FOREIGN PATENTS

| | | | |
|---|---|---|---|
| 714,093 | 7/1965 | Canada | 260—570.8 |

OTHER REFERENCES

Winthrop et al.: 'Jour. Organic Chem.," vol. 27, pages 230–5 (1962).

ROBERT V. HINES, Primary Examiner

U.S. Cl. X.R.

260—343.7, 501.1, 501.11, 556, 649, 669; 424—330